3,196,131
PROCESS OF PREPARING UNSATURATED POLYESTER RESINS

James F. Mayer Hinsdale, and William E. Gerwing, Jr., Chicago, Ill., assignors to Standard Oil Company, Chicago, Ill., a corporation of Indiana
No Drawing. Filed Sept. 22, 1960, Ser. No. 57,609
12 Claims. (Cl. 260—75)

This invention relates to unsaturated polyester resins and particularly to a process of preparing such resins.

In the preparation of unsaturated polyester resins from phthalic anhydride, maleic anhydride, and propylene glycol, there is little problem involved in carrying out the polycondensation (polyesterification-condensation) reaction with all of the reactants present simultaneously in the reaction vessel. This procedure, wherein all reactants are charged simultaneously and reacted simultaneously, is commonly known as the one-stage method.

It has been observed that when isophthalic acid is used in place of phthalic anhydride in the method, the one-stage method of resin preparation is not as effective for producing resins of optimum color and aging properties of the finished plastic materials. A procedure for overcoming a large part of this difficulty has been devised and is disclosed in U.S. Patent No. 2,904,533; this procedure utilizes a two-stage method of preparing the resin. In the first stage, the isophthalic acid, for example, is polycondensed with all of the glycol; the first stage reaction is continued until essentially a zero acid number product mixture is obtained in the cooking vessel. At this time, the unsaturated acid, such as maleic anhydride, is added to the cooking vessel and the polycondensation reaction continued until the desired acid number final unsaturated polyester resin is obtained. This two-stage method produces resins of better color and better environmental aging properties than is obtainable by the one-stage method. However, a very serious disability is present in this two-stage method over the one-stage method. The two-stage method takes from two to three times the number of hours to complete a resin preparation as does the one-stage method. For many purposes, the economic disabilities imposed by this increased processing time prevents the utilization of these particular unsaturated polyester resins.

Our copending application Serial No. 56,093, filed September 15, 1960, and entitled Preparation of Unsaturated Polyesters discloses a two-step process whereby an unsaturated polyester resin can be prepared having the desirable properties of the two-stage method resin prepared by the method described above and with essentially no penalty—in many cases a saving—with respect to processing time over the one-stage method of preparation. The process of the invention reacts the hereinafter defined benzene dicarboxylic acid and all or substantially all the hereinafter defined dihydric alcohol in a first polycondensation step for a time such that from about 55 percent to about 90 percent of the water of esterification theoretically producible in the first step is actually produced in and removed from the reaction vessel. Preferably, the amount of water of esterification produced in the first reaction step is about 85–90 percent of the theoretical producible by the reaction of the benzene dicarboxylic acid and the dihydric alcohol. At this point, the hereinafter defined unsaturated dicarboxylic acid is added to the reaction vessel containing the reaction product and unreacted materials of the first reaction step and in a second reaction step the polycondensation reaction is continued until the desired unsaturated polyester resin product is produced. The product unsaturated polyester resin generally has an acid number of not more than about 30 and more usually not more than about 20, and frequently below about 10.

Now, it has been discovered that superior laminating resins are obtainable by the use of two dihydric alcohols of different carbon atom content in a two-step reaction process where the higher boiling alcohol is charged to the first reaction step along with the benzene dicarboxylic acid. The first-step reaction is carried out at polycondensation conditions until the benzene dicarboxylic acid is solubilized or, more desirably, beyond this point until the reaction has gone to about the 90% point of water of esterification theoretically producible by the first step reactants. The unsaturated acid, the other dihydric alcohol and remaining first alcohol, if any, are then charged and the polycondensation reaction continued in a second-step until the desired unsaturated polyester resin is obtained.

The polycondensation reaction which is involved herein is the typical well known reaction, which is particularly well described in Chapter II of "Polyesters and Their Applications," by Bjorksten, Reinhold Publishing Corporation, 1956.

Another detailed presentation of suitable polycondensation conditions and equipment therefor for use in preparation of isophthalic acid unsaturated polyesters is given in a brochure of Oronite Chemical Co., entitled "Processing of Isopolyester Resins," January 15, 1960.

The benzene dicarboxylic acid reactant, charged to the first-step of the process, may be isophthalic acid itself, terephthalic acid itself, or mixtures of these. Commercial isophthalic acid may contain as much as 15% of terephthalic acid as an impurity. In addition to the defined acids themselves, alkyl substituted isophthalic acid and terephthalic acid may be used. The substituted acids contain one, two, or three alkyl groups and each alkyl group contains 1 to 4 carbon atoms. Illustrative of the substituted acids are methyl isophthalic acid, isopropyl isophthalic acid, t-butyl isophthalic acid, diethyl isophthalic acid, methyl terephthalic acid, and ethyl terephthalic acid.

The unsaturated dicarboxylic acid reactant, charged to the second step, is an acid or corresponding anhydride which contains 4–8 carbon atoms. Illustrative of these unsaturated dicarboxylic acids are fumaric acid, maleic acid, maleic anhydride, allylmalonic acid, allylmalonic anhydride, isopropylidene malonic acid, isopropylidene malonic anhydride, itaconic acid, itaconic anhydride, citraconic acid, citraconic anhydride, mesaconic acid, glutaconic acid, glutaconic anhydride, dimethylitaconic acid, methylene glutaric acid, allyl succinic acid, trimethyl glutaconic acid, and diethyl maleic acid. Fumaric acid and maleic anhydride are particularly suitable.

The dihydric alcohol reactants are the glycols (alkanediols) and the ether glycols (oxyalkanediols) containing 2–9 carbon atoms. The lower molecular weight compounds containing 2–6 carbon atoms are preferred. Illustrative of these alkanediols and oxyalkanediols are ethylene glycol, propylene glycol, 1,3-butanediol, 1,4-butanediol, neopentyl glycol, 1,6-hexanediol, 1,8-octanediol, diethylene glycol, triethylene glycol, tetraethylene glycol, dipropylene glycol, and tripropylene glycol.

The polyester resin of the invention requires two of the defined alcohols which contain a different member of carbon atoms, and one of the alcohols contains at least four carbon atoms. Illustrative pairs of glycols are: diethylene glycol and ethylene glycol; diethylene glycol and propylene glycol; dipropylene glycol and propylene glycol; dipropylene glycol and ethylene glycol; 1,8-octanediol and 1,4-butanediol; 1,8-octanediol and diethylene glycol; 1,7-heptanediol and ethylene glycol. It is preferred that one of the alcohols contain at least four carbon atoms and the other contain not more than three carbon atoms.

Where a particular carbon number permits two or more isomers with respect to hydroxyl group positions and/or carbon skeleton configuration, the alcohol charged to the process may be a single isomer or a mixture of isomers. In some instances, a mixture of a glycol and an ether glycol containing the same number of carbon atoms may be charged.

The defined benzene dicarboxylic acid and the defined unsaturated dicarboxylic acid are charged to the polycondensation reaction in amounts such that the desired combination of properties of the final resin are obtained. In general, the mole ratio of benzene dicarboxylic acid to the unsaturated dicarboxylic acid is from about 9:1 to 1:9. More usually this mole ratio is from about 4:1 to about 0.5:1 (1:2).

The defined dihydric alcohols are charged to the polycondensation reaction zone in a total amount sufficient to react theoretically with all of the carboxyl groups present therein, i.e., the carboxyl groups contributed by the two acids. Usually more than the theoretical amount of total dihydric alcohols are charged. The amount of excess hydroxyl groups is determined by the reaction conditions, the particular dicarboxylic acids charged, and the properties desired in the resin product. Usually the total amount of dihydric alcohol is not more than about 125 percent of the theoretical. More commonly, the usage of total dihydric alcohol is about 105–110 percent of the theoretical.

All of the benzene dicarboxylic acid is charged to the first reaction step.

The higher boiling alcohol is charged to the first reaction step. At least enough of this alcohol—hereinafter referred to as the first alcohol—is charged to solubilize the benzene dicarboxylic acid. The defined benzene dicarboxylic acids are only slightly soluble in the defined dihydric alcohol under these conditions. The monoester and low molecular weight polymers are very much more soluble or are liquids under these conditions. The term "solubilize" means that all of the benzene dicarboxylic acid has reacted or passed into solution in the material present in the reaction zone. It is usual to charge to the first reaction step about the amount of the first alcohol theoretically needed to react with the benzene dicarboxylic acid present. When more than the minimum amount of first alcohol is charged, the first reaction step is carried on beyond the solubilization point preferably. The degree of reaction in the first step is measured in terms of the water of esterification produced therein and removed therefrom. When sufficient first alcohol has been charged to react theoretically with all the carboxyl groups present in the first step, the first step reaction is not continued beyond the point where about 90 percent of the water of esterification theoretically producible by the first step reactants has been produced and removed from the reaction zone. In general, the first step will be continued until about 80–90 percent of the theoretical water of esterification has been produced and removed.

This point is readily determined by measuring the volume of water recovered from the reaction vessel (adjusting if necessary for loss of dihydric alcohol which will be measured as water) or may be observed visually as the equipment permits. It is desirable to continue the first stage reaction beyond the solubilization point until about not more than about 90 percent of the theoretical water has been produced, and removed in this step. (It has been found that many hours additional time are needed to drive the mixture of polyester, unreacted acid, and unreacted alcohol to substantially zero acid number after this 90 percent point has been reached.) The 90 percent point may, for some particular combination of reactants, be as much as 93 percent. Some leeway is permissible at this point without particularly adverse effect on the total polycondensation reaction time.

The first reaction step is carried out under typical polycondensation reaction conditions using equipment which permits continuous removal of water of esterification with little or no loss of alcohol. The first step reaction is carried out using agitation to disperse the solid benzene dicarboxylic acid throughout the alcohol which is liquid under these conditions.

When the desired amount of water has been produced from the reaction vessel, the unsaturated dicarboxylic acid is then charged to the reaction vessel containing the mixture of polyester and unreacted acid and alcohol. If all the first alcohol has not been charged to the first step, the remainder of the desired amount of first alcohol is also charged to the vessel. The desired amount of second alcohol is charged to the reaction vessel. The second alcohol is the lower boiling dihydric alcohol. It is preferred that all of the unsaturated dicarboxylic acid be charged to the reaction vessel containing the results of the first step reaction before the remaining first alcohol, if any, is charged and the second alcohol is charged. And then the second step of the total polycondensation reaction is begun. The second step reaction is continued until the polyester resin has the desired acid number which is not more than about 30 and more usually not more than about 20; and also the desired viscosity—or as close to the combination of these two desired characteristics as the particular reaction permits.

With isophthalic acid, the first step reaction generally reaches a maximum temperature on the order of 450–470° F. at about the time that the first step reaction is to be terminated. The unsaturated acid and second alcohol may be added to the reaction vessel at this same temperature. However, very careful control of the temperature in the vessel is needed during the initial stages of the second step reaction. It is easier to control the reaction by lowering the temperature of the contents of the reaction vessel before beginning the second step reaction. It is preferred to lower the temperature of the reaction vessel contents by rapidly adding all of the unsaturated dicarboxylic acid and all of the alcohol. It is desirable to have the temperature of the reaction vessel contents somewhat lower than the "initiation temperature" of the particular unsaturated acid charged. For example, fumaric acid and ethylene glycol begin to react vigorously at a temperature of about 380° F. As the reaction proceeds in the second step, the temperature is gradually raised until the final temperature is about 430–450° F.

It is to be understood that the process may be carried out at essentially any of the reaction conditions known by the art for polycondensation involving the defined reactants. When operating with terephthalic acid, reaction temperatures will be somewhat higher than with isophthalic acid.

The unsaturated polyester resin may be recovered from the reaction zone and utilized as a molding resin. Or the recovered resin may be, in a separate operation, dissolved in ethylenic or allylic monomer such as styrene and utilized for copolymerization, particularly in fibre-glass reinforced laminates. The ethylenic or allylic monomer is intended to include styrene itself, alpha methyl styrene, the various methyl styrenes, divinyl benzene, trivinyl benzene, ethyl styrene, and diethyl styrene; or any type of acrylic or methacrylic monomer; or allylic monomer such as diallylphthalate, diallylisophthalate or triallylcyanurate.

In the preparation of the monomer solution, the resin is cooled to a temperature on the order of 200–300° F. as determined by viscosity of the resin and viscosity of the resin solution. Normally polymerization inhibitors such as hydroquinone are added in order to avoid copolymerization during the solution preparation and during storage thereafter.

ILLUSTRATIONS

In the laboratory, comparative resins were prepared using electrically heated vessels provided with a carbon dioxide gas sparge and a thermometer; a condenser packed with glass beads or the like is connected to the reaction vessel. This condenser is maintained with steam at a temperature such that glycol was refluxed back to the column and water vapor permitted to pass through. Above this partial condenser was mounted a total condenser for condensing the water vapor. The condensate was collected and measured in order to determine the first step termination point.

In all of these comparative illustrations, the reactants were isophthalic acid, 3 moles; fumaric acid, 4 moles; diethylene glycol, 5.6 moles; and ethylene glycol, 1.6 moles.

In the illustration showing the process of the invention, all of the isophthalic acid and all of the diethylene glycol were charged to the reactor. The temperature was brought up over a period of one hour to about 460° F. The water recovery rate was followed closely and in Illustration I the termination point was at 85 percent of the theoretical water producible. At the termination point of the first step, all of the fumaric acid was added. The temperature of the reaction vessel dropped to approximately 360° F. Then the ethylene glycol was added. This temperature was brought up to about 380° F. and water of esterification was rapidly produced. The temperature was raised to about 445° F. and held at this temperature until the desired viscosity (Z-2 Gardner-Holt) was obtained at which time the run was terminated. This viscosity is that of a solution consisting of 70 percent resin and 30 percent styrene.

Illustration II was carried out using the two step method of our copending application Serial No. 56,093, filed September 15, 1960. In this Illustration II, all of the isophthalic acid and all of both glycols were charged to the reaction vessel at the beginning of the first step. The temperature was gradually brought up to about 460° F., the water recovery rate was followed closely, and the termination point was at 85 percent of the theoretical producible. At this point, all of the fumaric acid was added. The second step reaction was then begun with the temperature of the reaction vessel being raised to about 445° F. and held at this temperature until the desired Z-2 viscosity was obtained.

Illustration III was carried out using a two-stage procedure. In this two-stage procedure, the isophthalic acid and all of both glycols were charged to the reaction vessel. The temperature was raised to about 460° F. and held until the acid number of the reaction vessel contents was about 5. Using the recommended procedure, the temperature of the recation vessel was lowered to about 300° F. Then the fumaric acid was added. The temperature was raised to about 445° F. and held until the desired viscosity was obtained.

Reinforced resin sheets (laminates) were prepared from each of the three illustrative resins and tested for impact resistance and torsional modulus (p.s.i.×10⁶). A glass mat was used as the reinforcing material. Each panel measured 10 inches by 10 inches and after baking had a thickness of one-tenth inch. Sufficient glass mat and 30 mil overlay glass material was used in the preparation of each panel to afford 6 ounces per square foot of reinforcing material. The resin solution consisted of 70 weight percent of resin containing 1 weight percent of benzoyl peroxide and 30 weight percent of styrene monomer. A dispersion was prepared consisting of 75 weight percent of resin solution and 25 weight percent of ASP-400 clay. The dispersion was poured over the glass mat which has been positioned in a semi-positive compression mold and the press was closed to stops affording a one-tenth inch. This laminate was maintained at 235° F. for three minutes. A post-cure was given consisting of one hour at 180° F.

The cured panels were tested for strength by an impact test wherein a 1 pound steel ball 1.5 inches in diameter was dropped onto the panel; the side opposite the striking area is coated with a dye which is then wiped clear; minute cracks are revealed by dye retained. The height at which the dropped ball produces detectible cracks is taken as the impact strength of the laminate and is measured in inch-pounds. The torsional modulus of the laminate was determined by the ASTM procedure.

The cooking time in hours for each of the illustrative resins, the acid number of each resin (the viscosity of the 70:30 styrene solution of each resin was Z-2), the impact strength, the torsional modulus are set out in the table below.

Table

| Procedure | Time in Hours | Acid Number | Impact, In.-Lbs. | Torsional Modulus (p.s.i.×10⁶) |
|---|---|---|---|---|
| I | 5.5 | 11 | 11-12 | 0.57 |
| II | 6.8 | 12 | 9 | 0.59 |
| III | 9.5 | 22 | 8 | 0.51 |

The above results show that the process of the present invention produces resin of the same viscosity and essentially the same acid number as does the two step process of our copending application with a saving of about 15 percent in cooking time. Also, a markedly stronger laminate is produced by the polyester resin of the process of the invention than by the resin of the two step process. The torsional modulus of the polyester resin produced by the process of the invention is essentially the same as that produced by the two step process. It is seen that a very large saving in time is obtained over the prior art two stage process; also, the acid number of the present resin is much lower as is desirable than the prior art two stage resin. The prior art two stage resin had a considerably lower impact distance than did the resin produced by the process of the invention and had a substantially lower torsional modulus than did the resin of the instant invention. (It is to be understood that statements with respect to impact and torsional modulus refer to the properties of the laminate produced by the particular resin.)

Thus, having described the invention, what is claimed is:

1. The process for preparing unsaturated polyesters comprising the steps of (1) reacting under polycondensation conditions a reactive mixture consisting essentially of reactants (A) a benzene dicarboxylic acid of the group consisting of isophthalic acid, terephthalic acid, alkyl isophthalic acid, alkyl terephthalic acid and mixtures thereof where each substituted acid contains 1-3 alkyl groups and each alkyl group contains 1-4 carbon atoms, and (B) a first dihydric alcohol, hereinafter defined, in an amount sufficient to solubilize said benzene dicarboxylic acid, the reaction being continued until the water of esterification theoretically producible by the first step reactants has been produced and removed from the reaction zone, the amount of water removed corresponding to the amount producible at the benzene dicarboxylic acid solubilization point but not exceeding about 90 percent of the theoretically producible amount, and (2) reacting under polycondensation conditions the product mixture present in said reaction zone at the completion of said first step with (i) an unsaturated dicarboxylic acid containing 4-8 carbon atoms of the group consisting of alkenedioic acids and anhydrides thereof and (ii) a second dihydric alcohol, hereinafter defined, until an unsaturated polyester resin product having an acid number of not more than about 30 is obtained, wherein the mole ratio of benzene dicarboxylic acid to unsaturated dicarboxylic acid charged is from about 9:1 to 1:9, and the total amount of said first and said second dihydric alcohols charged is at least sufficient to react theoretically with the carboxyl groups present in said two acids, and wherein said first and said second dihydric alcohols are selected from the group consisting of alkanediols and oxyalkanediols containing 2-9 carbon atoms; said first alcohol and said second alcohol contain a different number of carbon atoms; one of said alcohols contains at least 4 carbon atoms; and said first alcohol is the higher boiling of said first and said second alcohols.

2. The process of claim 1 wherein said benzene dicarboxylic acid is isophthalic acid.

3. The process of claim 1 wherein said benzene dicarboxylic acid is terephthalic acid.

4. The process of claim 1 wherein said unsaturated dicarboxylic acid is maleic anhydride.

5. The process of claim 1 wherein said unsaturated dicarboxylic acid is fumaric acid.

6. The process of claim 1 wherein the amount of said first alcohol present in step one is at least about the theoretical amount needed to condense with said benzene dicarboxylic acid and the reaction in said first step is continued to the point where said water of esterification removed is about 85–90 percent.

7. The process of claim 1 wherein said first alcohol contains at least 4 carbon atoms and said second alcohol contains not more than 3 carbon atoms.

8. The process of claim 1 wherein said first alcohol is diethylene glycol and said second alcohol is ethylene glycol.

9. The process of claim 1 wherein said first alcohol is diethylene glycol and said second alcohol is propylene glycol.

10. The process of claim 1 wherein said first alcohol is dipropylene glycol and said second alcohol is propylene glycol.

11. The process of claim 1 wherein said first alcohol is dipropylene glycol and said second alcohol is ethylene glycol.

12. The process of claim 1 wherein said benzene dicarboxylic acid is 3 moles of isophthalic acid, said unsaturated dicarboxylic acid is 4 moles of fumaric acid, said first alcohol is 5.6 moles of diethylene glycol and said second alcohol is 1.6 moles of ethylene glycol, and the reaction in said first step is continued to the point where said water of esterification removed is about 85–90 percent.

References Cited by the Examiner
UNITED STATES PATENTS

| | | | |
|---|---|---|---|
| 2,562,878 | 8/51 | Blair | 260—75 |
| 2,904,533 | 9/59 | Carlston et al. | 260—75 |

FOREIGN PATENTS 531,287  10/56  Canada.

WILLIAM H. SHORT, Primary Examiner.

PHILIP P. MANGAN, LOUISE P. QUAST, Examiners.